March 30, 1943.   R. N. DICKEY   2,314,872
HOTCAKE AND WAFFLE COOKING UTENSIL
Filed May 16, 1940   3 Sheets-Sheet 1

INVENTOR
ROY N. DICKEY
BY
Cook & Robinson
ATTORNEY

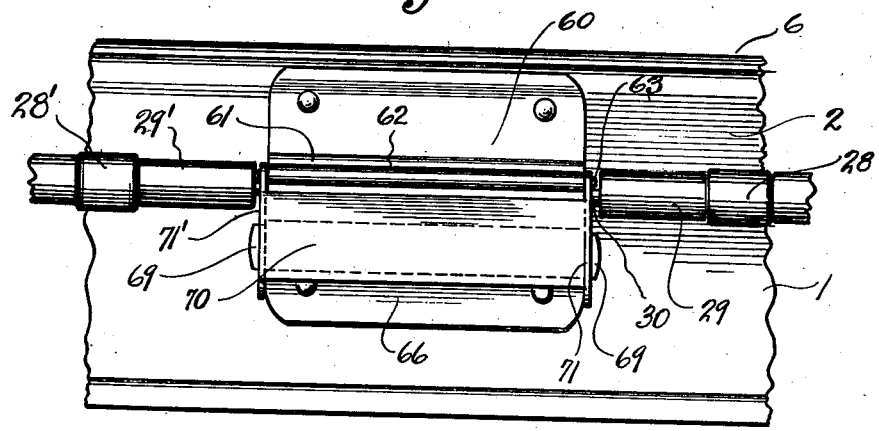
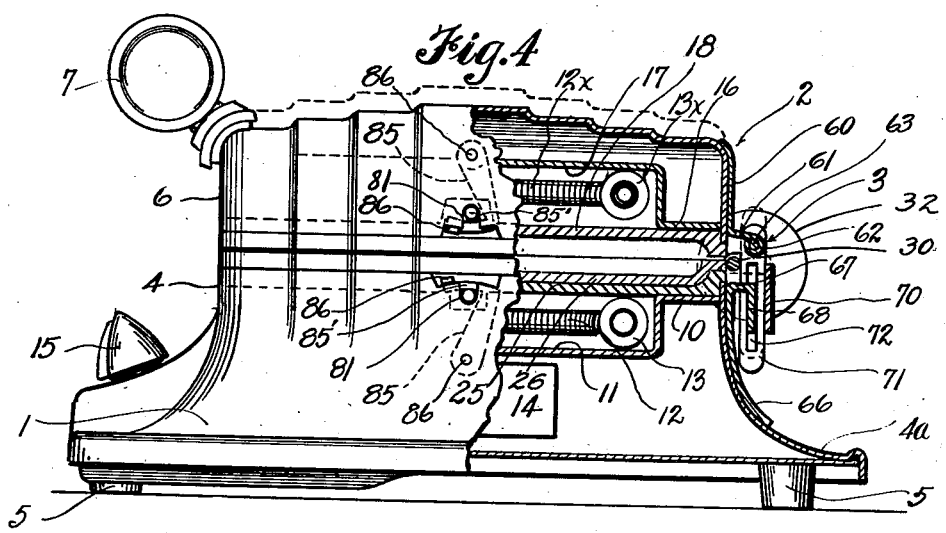
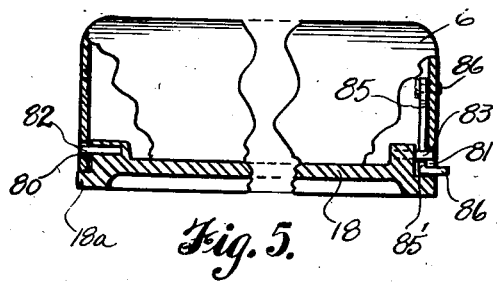

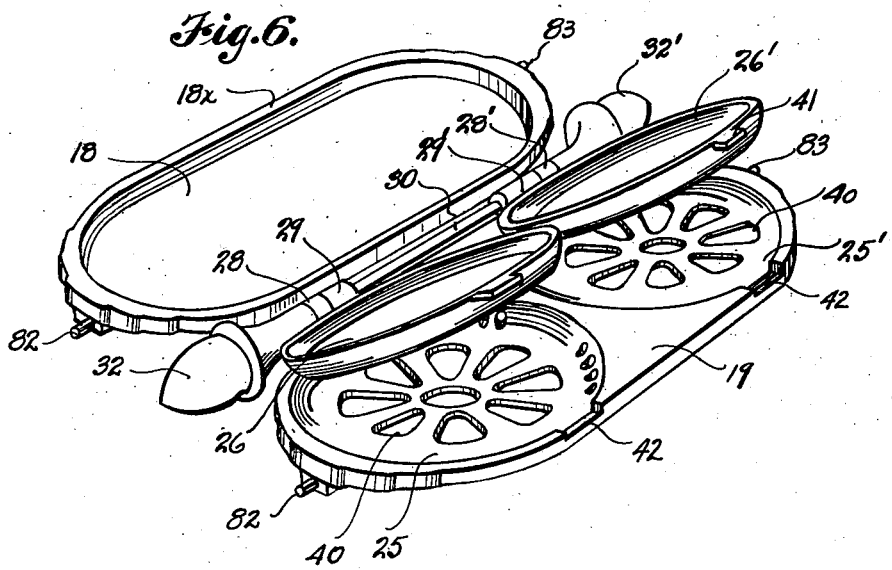

Patented Mar. 30, 1943

2,314,872

UNITED STATES PATENT OFFICE 2,314,872

HOT CAKE AND WAFFLE COOKING UTENSIL

Roy N. Dickey, Seattle, Wash., assignor to Meets-A-Need Manufacturing Company, Seattle, Wash., a corporation of Washington Application May 16, 1940, Serial No. 335,539

5 Claims. (Cl. 53—10)

This invention relates to electrically heated utensils for the cooking of hotcakes and waffles, and has reference more particularly to improvements in cooking utensils of that character illustrated and described in U. S. Letters Patent No. 1,907,441, issued May 9, 1933, to John Campbell and Clarence H. Pickering; the present improvement being in the provision of means for adapting utensils of the character described in the above patent for the cooking of waffles or the like.

It is the principal object of this invention to equip the utensil of the above mentioned patent with an expanding hinge of novel kind which will permit the joined sections of the utensil to move apart as required to accommodate the expansion of the material being cooked and to provide an improved type of hinge for mounting the cake turning plates or molds that is not combined with the expanding hinge of the two sections, but permits the cake turning molds to be rotated about an axial line that coincides with the hinge axis of the hinge that joins the sections of the utensil.

Other objects of the invention reside in the details of construction and combination of parts, as will hereinafter be fully described.

In accomplishing these and other objects of the invention, I have provided the improved details of construction, the preferred forms of which are illustrated in the accompanying drawings, wherein—

Fig. 3 is a partial rear view of the utensil, with the cover section in closed position, and particularly illustrating the expanding hinge structure whereby the top section is connected with the base section.

Fig. 4 is a partial end view, and partial cross-sectional view of the utensil as equipped with plates for the cooking of waffles and showing the top section closed; also, illustrating the hinge connection of the top and bottom sections of the utensil to accommodate waffle expansion.

Fig. 5 is a detail showing the latch devices as used for engaging studs of a cooking plate to secure it in position in its housing.

Fig. 6 is a perspective view of the hotcake cooking plates as equipped with the cake turning molds.

The present device is designed somewhat in accordance with the device of the previously mentioned patent. However, it is to be explained that while the device of the patent comprises electrically heated, and hingedly attached complemental sections adapted to be opened apart to provide two horizontal cooking surfaces, and cake molds are provided and usable for transferring of hotcakes from one surface to the other and for turning them over incident to their transfer, the patent does not contemplate, nor is it adapted to the interchangeable use of plates for the baking of waffles or hotcakes, and could not, as designed, be satisfactorily employed for waffles, due to the character of the plates and the type of hinge connection used.

Also, it was found that, in adapting the device, as disclosed by the patent, to the interchangeable use of waffle molds and hotcake plates, it was not possible to use the turning shaft as a hinge pin since this shaft was permanently attached to the turning molds associated with the cake cooking plates. Furthermore, the equipping of the utensil with an expanding hinge for waffle cooking purposes and providing for the removal of the cake cooking plates and molds made it necessary to equip these latter parts with a separate hinge mechanism, but which would operate about the same axial line as that of the expanding hinge when the device was used for cake cooking purposes.

Furthermore, it was deemed essential that simple and effective means should be employed for the securement of the plates being used, yet provide for easy and quick release when replacement is desired.

Referring more in detail to the drawings—

Figure 1:
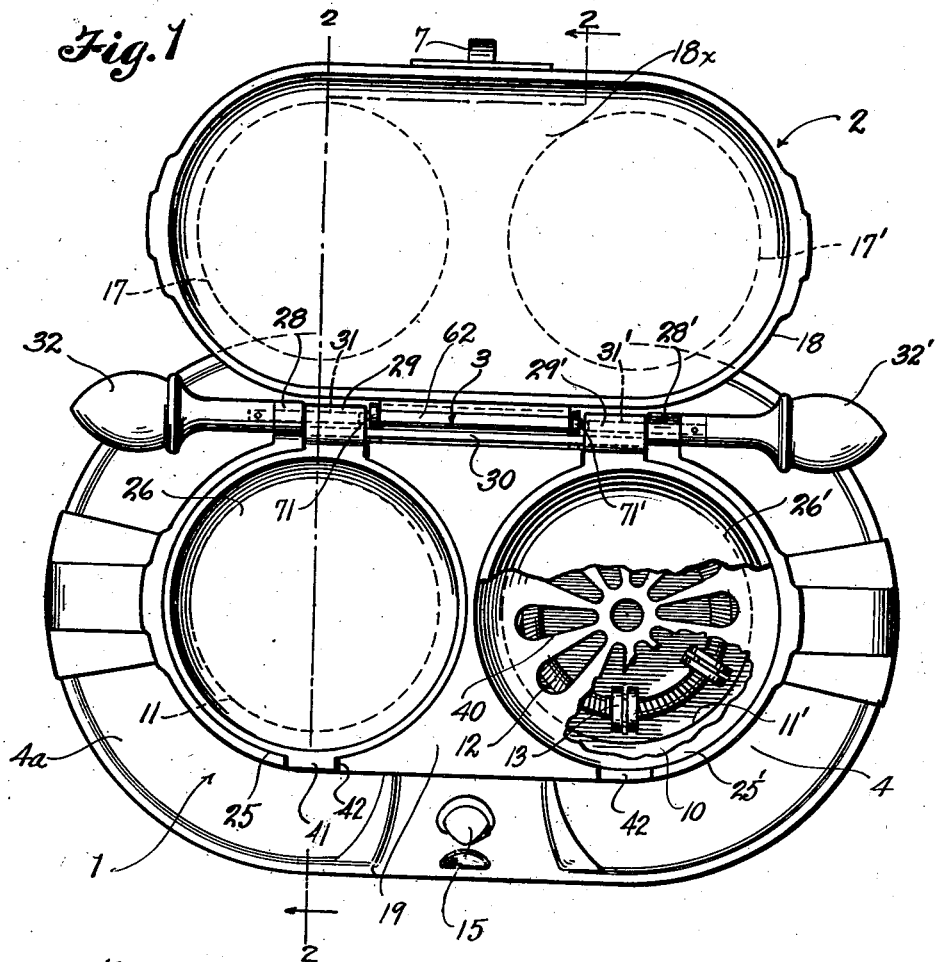
Fig. 1 is a plan view of the present utensil, shown in open position, and as equipped with plates and cake turning molds which adapt it for the cooking of hotcakes; one of the cake molds having a part broken away for better illustration of underlying parts.

In its present preferred form of construction, the cooking utensil as embodied by this invention comprises complemental base and top sections; the former being designated in its entirety by reference numeral 1, and the latter section being designated in its entirety by reference numeral 2. These two sections are connected by a hinge structure, designated generally at 3, and presently described in detail, which permits the top section to be swung upwardly about a horizontal axis, from its closed position resting flatly upon the base, as seen in dotted lines in Fig. 2, to the open position and in full lines in Fig. 4, to the open position in which it is shown in Figs. 1 and 2, thus to provide two horizontal heating surfaces lying substantially in the same plane.

In the present instance, the base section 1 comprises an enclosing housing 4 of metal and of oval outline, formed with a flaring skirt, or base portion 4a, and this is equipped with suitable legs 5 whereby to sustain the device spaced somewhat above any supporting surface on which it might be placed.

Figure 2:
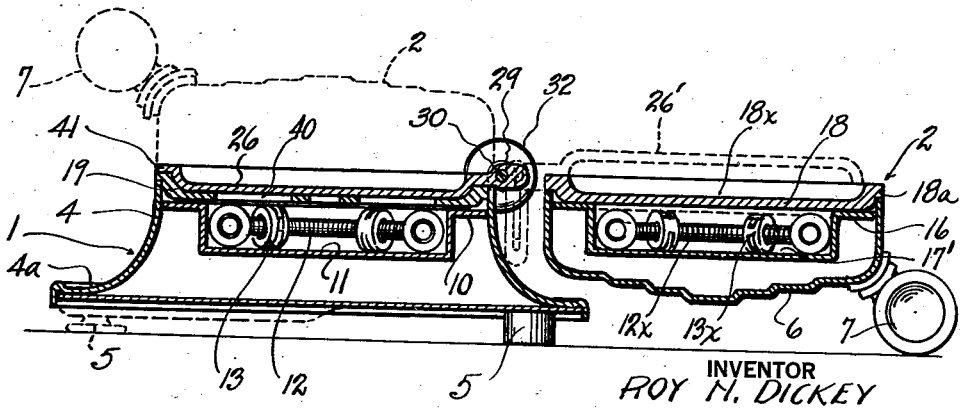
Fig. 2 is a cross sectional view of the utensil, as seen on line 2—2 in Fig. 1, showing the cover, or top section in its open position.

The top section 2 of the device comprises a formed housing 6 of metal, corresponding in outline to the upper portion of the base section, and provided at the side opposite the hinge connection with a knob, or handle 7, which serves as a convenient means whereby the top section may be swung about the hinge axis between open and closed positions, and also, when the device is in open position, serves as a supporting leg to engage the table top or other surface on which the utensil is placed, to support the heating plates mounted by the two sections, in the same plane, as will be understood by reference to Fig. 2.

Set down somewhat within the top edge of the base housing, is a horizontal plate 10 having two circular basins 11 and 11' formed therein, and in each of these basins there is contained an electrical heating element 12 carried in insulating spools 13 which are suitably fixed to the plate. These elements have electrical connection through means contained within the base housing, with circuit wires leading through a thermostatic switch, designated at 14 in Fig. 4, to a suitable supply of current. In this instance, the flow of current is under control of a switch adjusting knob 15 at the front of the housing.

Fitted in the open side of the housing 6 of the top section 2, as noted in Fig. 2, is a plate 16, and this is formed with two circular depressions or basins 17 and 17', in the positions as indicated in dotted lines in Fig. 1. These latter basins, 17—17', are of the same size as those formed in the plate 10 of the base section, and when the top section of the utensil is closed over the bottom section, as in Fig. 4, the basins therein and basins 11 and 11' of plate 10, will be substantially in vertical alinement. The basins 17—17' also are equipped with heating elements, designated at 12x, supported by insulators 13x, and these elements are also connected to the supply circuit through switch 14 under control of switch knob 15.

It is to be observed by reference to Figs. 2 and 4 that the plates 10 and 16 are set down within the open side of their respective housings 4 and 6 to provide space for the reception of the interchangeable plates for cake or waffle baking.

It will be explained that the utensil as illustrated in Figs. 1 and 2, is equipped with the plates of Fig. 6, for the cooking of hotcakes, and the top section of the utensil is shown in the open position as required for the proper cooking of hotcakes. These plates, to be used in the utensil for the baking of hotcakes, are designated respectively by reference characters 18 and 19 and are of such size that they will fit within the open sides of their respective housings 4 and 6, and when so applied, will closely overlie the plates 10 and 16 and will be properly disposed over the heating elements enclosed in the plate basins. In Fig. 2, the plates 18 and 19 are shown as functionally secured in the housings and the sections 1 and 2 opened apart. While in use, the plates are secured in place by latch devices, presently described, which are mounted in the ends of the housings 4 and 6, as observed in Fig. 4.

The plates 18 and 19, as used for the cooking of hotcakes, and as illustrated best in Figs. 2 and 6: The plate 18, which is relatively thin and flat, is fitted down within the open side of the housing 6 of the top section of the device. This plate has a peripheral flange 18a that extends beyond and rests on the edge of the housing 6, and the bottom surface of the plate rests flatly against or close to the plate 16. The top, or cooking surface of the plate 18 is formed with a shallow basin 18x which covers the entire area of the plate except a narrow peripheral portion. This plate forms a cooking surface that is heated over its entirety by the elements 12x in the basins of plate 16.

The plate 19 is of a size adapted to fit within the open top of the housing 4 of the base section 1, as noted in Fig. 2, and is adapted to be removably secured in its housing by means of the latch devices, mounted on the ends of the housing to holdingly engage with the plate. When this plate is functionally applied to its housing, it closely overlies the plate 10 and the heating elements 12 contained in the basins 11, and will readily be heated over its entire surface.

The plate 19 is formed in its top side with two circular basins 25 and 25', located directly over the basins 11 and the contained heating elements, and normally contained in these basins are the cake molds 26 and 26' of saucer-like form, which lie flush with the top of the plate when seated in their respective basins, as noted in Fig. 2.

Formed on the plate 19, near its ends and at the hinge side of the utensil, and extending laterally thereof, are hinge lugs 28 and 28', and likewise formed on and extending laterally from the side edges of the circular cake molds 26 and 26' respectively, are hinge lugs 29 and 29'. A hinge rod 30 extends between and is rigidly fixed at its ends in the lugs 29 and 29' to hold the mold plates in definite spacing and in the same plane, and there are short hinge shafts 31 and 31' extended revolubly through the hinge lugs 28 and 28' and are fixed at their inner ends in the lugs 29 and 29' and at their outer ends have turning knobs 32 and 32' fixed thereon.

When cakes are to be cooked, the mold plates 26 and 26' are first disposed in the basins 25 and 25' of the plate 19, as will be understood by reference to Figs. 1 and 2, and the cake batter is placed therein, to cook the cakes on one side. It will be understood then that, when the cake is cooked on that side, by grasping and turning either of the knobs 32 and 32', the two mold plates 26 and 26' may be swung from the position nested in basins 25 and 25' of plate 19, to an inverted position directly overlying the plate 18. In this way, cakes being cooked on one side in the molds 26—26' may be turned over and placed on plate 18 for cooking on the other side, as is more fully described in the patent previously mentioned.

Attention is also directed to the fact that the two short hinge shafts 31 and 31' are axially alined and that the hinge rod 30 is offset from, but parallel to the axial line of the shafts 31 and 31' so as to place the rod in the clear of the hinge structure 3 which joins the two sections of the utensil together, as presently will be disclosed.

In order to provide for quick heating of the mold plates 26 and 26' when in position nested in the basins 25 and 25' of plate 19, as shown in Fig. 2, the bottom of these basins are formed with a plurality of radial openings 40 as noted in Fig. 1, and these openings may be made as large, and of such shape and in such locations as found most advisable.

The molds are provided with lateral wings 41 at their swinging edges and these are adapted to be bumped against the outer edge of plate 18 to facilitate the discharge of turned cakes that might stick in the molds. These wings are adapted, when the molds are in normal position, to be received within seats 42 provided therefor in the outer edge of the base plate 19.

When it is desired to use the utensil for the cooking of waffles, the plates 18 and 19, and incidentally, the two cake molds 26 and 26' with the operating knobs 32 and 32' are released and lifted out of their respective housings. Then they are replaced by the two waffle baking molds or plates which would be secured in place as were the hotcake plates.

The hinge structure 3 whereby the two sections of the utensil are joined, is illustrated best in Figs. 3 and 4, and it comprises the following parts: Fixed on the back wall of the housing 6 is a hinge plate 60 having a rearwardly directed flange 61 along its lower edge terminating in a cylindrical curl 62 in which a hinge pin 63 is contained, with its ends extending slightly beyond the ends of the flange.

Likewise fixed on the back wall of housing 4 is a hinge plate 66 having an out-turned flange 67 along its top edge, and this is formed with a vertically, downturned plate 68, with opposite end extensions 69 and 69' which lie in vertical planes.

Disposed in a plane parallel with and lying outside of the plate 68, as seen in Fig. 4, is a flat plate 70 with inturned flanges or wings 71 and 71' at its opposite ends. At their upper ends, these wings, respectively, are pivoted on the opposite ends of the hinge pin 63, and formed in the wings lengthwise thereof, are vertical slots 72 which slidably contain the extension portions 69 and 69' of the plate 68 therein. These slots are longer than the height of the extension portions 69 and 69' and therefore the plate 70 may be raised or lowered to the extent permitted by the limits of the slots 72, and this movement is such as required for the usual expansion of waffle batter during a cooking operation. However, the hinging action provided by the connection of pin 63 with the upper ends of the wings 71—71' retains the section 2 in proper relationship to section 1.

It is to be pointed out also that the flange portions 61 and 67 of the two hinge plates are so disposed as to lie respectively above and below the rod 30 and the entire length of the hinge located within the distance between the hinge ears 29—29'. When the top section is in its open position, as in Fig. 2, the plate 19 and its associated parts including the molds 26—26' and rod 30 may be lifted from place or replaced without interference with the hinge structure.

Now, describing the latch devices, as shown in Fig. 5, for securement of the plates in their respective housings:

The housings 4 and 6 are each provided, in one of its end walls, with a hole 80, and at the other end with a notch 81 opening to the edge of the housing in which the cooking plate is to be received, as will be understood by reference to Figs. 4 and 6, and each plate 18 and 19, for the cooking of cakes, and also each of the plates 45 and 46 for the cooking of waffles, is provided at one end with a short stud 82 adapted, upon seating the plate in its housing, to be received in the corresponding holes 80. At their other ends, the plates are provided with short studs 83 adapted to be received in the corresponding notches 81. Mounted on the inside of the end walls of the housings 4 and 6, adjacent the notches 81, are latch hooks 85 secured by pivots 86. Each latch has a hook end 85' adapted to be swung to position to engage the corresponding plate stud 83 to hold that end of the plate from being unseated from its housing as will be best understood by reference to Fig. 4. Each latch has an outwardly extending leg 86 bent out from the hook end and exposed at the outside of the housing for moving the hook to and from holding contact with the plate stud. To remove a plate, it is only necessary to release the end hook, lift that end of the plate clear of the housing, then withdraw the opposite end stud from the housing.

It will be understood that by the construction and arrangement of parts as described in the foregoing, the utensil is well adapted for either of its described uses. The plates may be easily and readily interchanged and the hinge structure permits this to be acomplished without disconnection of the hinged sections.

Furthermore, the hinge structure permits the automatic adjustment of the sections as required for the expansion in the cooking of waffles. Also, the structure of the plates and the location of heating elements relative thereto facilitates cooking with an even and quick distribution of heat.

The present hinge structure for the cake turning molds is important as it provides that while the base and top sections of the utensil may be permanently joined in a hinged connection which accommodates it to expansion when necessary, and at the same time provision is made for the interchangeable use of plates without necessitating disconnection of the hinge, the hinging action of the cake-turning plates is provided for about the same axis of the main hinge, but without any connection therewith.

Having thus described my invention, what I claim as new therein and desire to secure by Letters Patent is:

1. In a cooking utensil of the character described, comprising a base section, a top section, a hinge connecting the two sections and having a horizontal hinge axis along one side of the utensil permitting the top section to be moved from closed to an open position at which latter position the top surfaces of the sections will be substantially in the same horizontal plane, heating elements in the sections, and a cake turning device comprising a base plate removably fitted in the top of the base section, to be heated by the elements therein, hinge lugs extending from the side of the base plate at opposite ends of the hinge whereby the sections are connected, a turning shaft mounted in said lugs in the axial line of the said hinge axis and having a part thereof between the said lugs offset to avoid interference with the hinge connecting the two sections, and a plurality of cake molds fixed to the turning shaft and movable therewith from a position resting upon the base plate, to an inverted position overlying the top surface of the other section.

2. A cooking utensil as in claim 1 wherein the base plate of said cake turning device has basins formed therein overlying the heating elements for that section, and said basins have openings in their bottom walls of substantial area, and wherein the said cake turning devices are adapted to be disposed within said basins for direct application of heat thereto through said bottom wall openings of said basins.

3. In a cake cooking utensil comprising complemental heated plates, a shaft rotatably mounted by one of the plates, means for turning the shaft, a cake mold and turning device fixed at one edge to the shaft and movable thereby from a position flatly resting upon the shaft mounting plate to an inverted position over the other plate, and an extension wing on the mold plate at its swinging edge adapted to engage the plate as a bumper for displacement of a cake from the mold.

4. A cooking utensil of the character described comprising complemental sections, a hinge connecting the sections and having a horizontal hinge axis about which one section may be swung from a position closed upon the other to a position at one side thereof, means for heating the sections, and a cake cooking and turning device comprising a base plate applied to the top of one section for heating therein, hinge lugs extending from said base plate beyond the ends of the section joining hinge, turning shafts rotatably mounted in said lugs in axial alinement with each other and with the axis of the section joining hinge, a pair of cake molds adapted to rest within the base plate and having fixed connection respectively with the turning shafts, and means rigidly joining the molds and offset from the axis of the first mentioned hinge whereby the molds will be caused to swing as a unit and without interference with the section joining hinge.

5. A cooking utensil of the character described comprising complemental sections, a hinge connecting the sections and having a horizontal hinge axis about which one section may be swung from a position closed upon the other to a position at one side thereof, means for heating the sections, a cake cooking and turning device comprising a base plate applied to the top of one section for heating therein, hinge lugs extending from the base plate beyond opposite ends of the section joining hinge, turning shafts rotatably mounted in said lugs in axial alinement with each other and with the axis of the section joining hinge, a pair of cake molds adapted to rest within the base plate, a lug extending from each mold along side the lugs of the base plate and having fixed mounting respectively on said turning shafts, a shaft extending between the last mentioned lugs and rigidly joining them to swing as a unit; said last shaft being offset from the hinge axis to operate in the clear of the section joining hinge.

ROY N. DICKEY.